United States Patent [19]

Piotrowski

[11] 4,397,874

[45] Aug. 9, 1983

[54] POPCORN POPPING

[76] Inventor: Eugene G. Piotrowski, 3308 Algoma St., Stevens Point, Wis. 54481

[21] Appl. No.: 251,276

[22] Filed: Apr. 6, 1981

[51] Int. Cl.³ .......................... A23B 3/04; A23L 1/18
[52] U.S. Cl. .................................. 426/450; 99/323.5; 426/111; 220/93
[58] Field of Search ............... 99/323.4, 323.5, 323.8, 99/323.9, 323.11; 220/93, 216, 220, 85 CH; 426/450, 625, 111, 18, 113; 126/373, 383, 390

[56] References Cited

U.S. PATENT DOCUMENTS

| D. 227,538 | 7/1973 | Press . | |
| 797,314 | 8/1905 | Owens . | |
| 1,881,615 | 10/1932 | Isaacson . | |
| 1,990,918 | 2/1935 | Ramsden | 220/216 |
| 2,828,886 | 4/1958 | Thomas . | |
| 3,506,459 | 4/1970 | Parlour | 426/111 |
| 3,782,976 | 1/1974 | Maier | 426/111 |
| 3,873,738 | 3/1975 | Zoeller | 426/111 |
| 3,952,374 | 4/1976 | Mohorovich | 220/85 CH |
| 4,138,937 | 2/1979 | Weese | 99/323.5 |

FOREIGN PATENT DOCUMENTS 367681 2/1932 United Kingdom ............... 126/383

Primary Examiner—Robert W. Jenkins
Attorney, Agent, or Firm—Andrus, Sceales, Starke & Sawall

[57] ABSTRACT

A deep walled pan is provided with the pan rim and upper wall portion forming a slightly cross sectional pan area greater than that of the pan cover. Between the pan rim and bottom, the wall is formed to provide a reduction in cross sectional pan area to less than that of the cover. The cover then can fit down into engagement with the pan wall to form with the pan bottom, an enclosed chamber utilizing only a small portion of the total pan volume. When corn kernels are placed on the pan bottom and the cover put in place, an energy saving low preheat is applied which quickly brings the small chamber up to popping temperature. Once the kernels begin to pop, a higher heat is applied. The expanding popcorn initially rises to the cover. Subsequently, the popping chamber automatically expands upwardly by virtue of the cover being forced upwardly within the pan by the expanding popcorn. During this expansion, the expanding chamber remains essentially closed, with the upper side wall portion of the pan functioning as a splatter shield during progressive raising of the cover and popped corn.

1 Claim, 3 Drawing Figures

POPCORN POPPING

U.S. PRIOR ART OF INTEREST

| Number | Inventor | Issue Date |
| --- | --- | --- |
| 797,314 | Owens | Aug. 15, 1905 |
| 1,881,615 | Isaacson | Oct. 11, 1932 |
| 1,990,918 | Ramsden | Feb. 12, 1935 |
| 2,828,886 | Thomas | April 1, 1958 |
| Des. 227,538 | Press | July 3, 1973 |

BACKGROUND AND SUMMARY OF THE INVENTION

This invention relates to popcorn popping and a unique concept relative thereto.

In the simplest well-known method of popping popcorn, which is an expandable food material, a person usually uses an ordinary frying pan or the like with a cover which is adapted to fit on the pan's top edge or rim. Popcorn kernels and cooking oil are placed in a layer in the pan bottom and the pan then subjected to relatively high heat on a stove or the like. During heating, there is a large space or chamber above the unpopped kernels and extending up to the rim of the pan, which must be brought up to popping temperature before the corn will pop. As it pops, the expanding popcorn raises up towards the cover and pan rim and often finally causes the cover to be lifted from the pan rim.

Such a system has several disadvantages. Firstly, the popping chamber is usually quite large to accommodate a majority of the popped corn, and requires a substantial amount of unnecessary heat to bring the entire chamber up to popping temperature. Secondly, during popping the usual cooking oils splatter on the pan walls and cover. When the cover is forced up from the pan rim by the expanding corn, these oils will drip from the cover and also eject through the open peripheral space between the raised cover and pan rim, causing splattering of the oils all over the area surrounding the pan. Popped corn also may spill outwardly onto the surrounding surface.

The concept of the present invention solves the above problems in a simple yet effective manner.

In accordance with various aspects of the invention, a deep walled pan is provided with the pan rim and upper wall portion forming a slightly cross sectional pan area greater than that of the pan cover. Between the pan rim and bottom, the wall is formed to provide a reduction in cross sectional pan area to less than that of the cover. The cover then can fit down into engagement with the pan wall to form, with the pan bottom, an enclosed chamber utilizing only a small portion of the total pan volume.

When corn kernels are placed on the pan bottom and the cover put in place, an energy saving low preheat is applied which quickly brings the small chamber up to popping temperature. (This contrasts with previously having to bring the entire internal pan volume up to popping temperature.) Once the kernels begin to pop, a higher heat is applied. The expanding popcorn initially rises to the cover. Subsequently, the popping chamber automatically expands upwardly by virtue of the cover being forced upwardly within the pan by the expanding popcorn. During this expansion, the expanding chamber remains essentially closed, with the upper side wall portion of the pan functioning as a splatter shield during progressive raising of the cover and popped corn.

BRIEF DESCRIPTION OF THE DRAWINGS

The accompanying drawings illustrate the best mode presently contemplated by the inventor for carrying out the invention.

In the drawings.

DESCRIPTION OF THE PREFERRED EMBODIMENT

Figure 1:
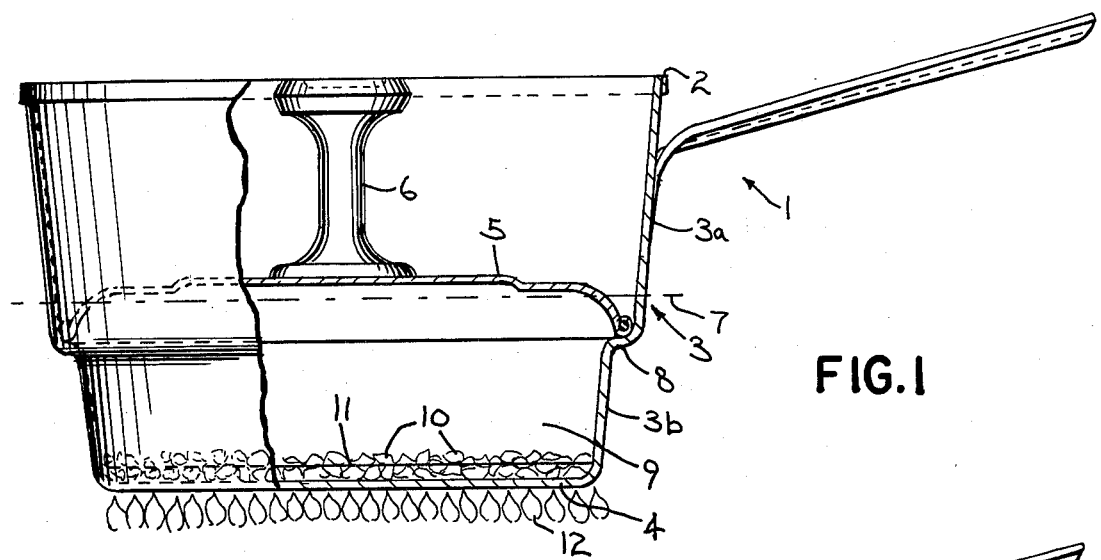
FIG. 1 is a side elevation of a popcorn popping pan and cover constructed in accordance with the concepts of the invention, with parts broken away.

As shown in FIG. 1, the concepts of the invention contemplate utilization of a deep walled pan 1 having an upper rim 2, a side wall 3 and a bottom 4. A removable cover 5 having a suitable handle 6 is constructed for use with pan 1 in popping popcorn. Pan 1 is formed so that rim 2 and the upper portion 3a of side wall 3 form a slightly greater cross sectional pan area than that of cover 5 so that the latter does not rest on rim 2 but can be lowered into the pan.

Below the midline 7 between rim 2 and bottom 4, side wall 3 is formed to provide a cross sectional pan area smaller than that of cover 5. In the present embodiment, an inwardly extending peripheral stop shoulder 8 is formed in wall 3 upon which cover 5 normally rests. Shoulder 8 separates wall 3 into the aforementioned upper portion 3a which extends upwardly to rim 2, and a lower portion 3b which extends downwardly to join with bottom 4. Thus, wall portion 3b, bottom 4 and cover 5 cooperate to form a small enclosed popping chamber 9 of less than one-half the total pan volume.

FIG. 1 shows unpopped solid corn kernels 10 and a thin layer of liquid cooking oil 11 introduced into pan 1 and distributed over bottom 4 in the usual manner. A low preheat, such as by flames 12, is applied to the pan. It is only necessary to bring the small chamber 9 up to popping temperature before kernels 10 begin to pop, thus providing a savings of energy.

Figure 2:
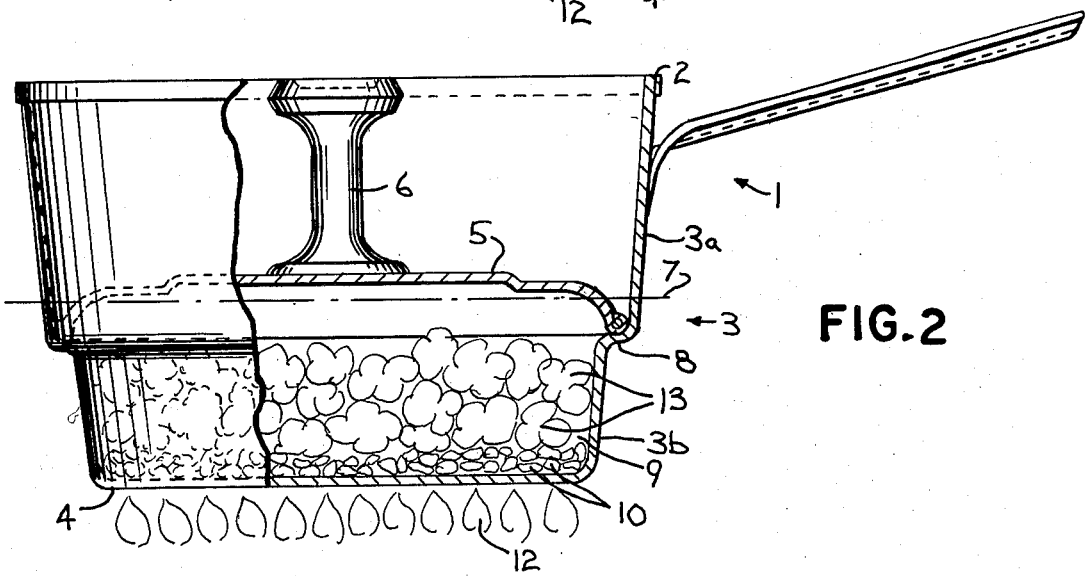
FIG. 2 is a view similar to FIG. 1 and showing the popping corn rising to fill the lower chamber.

Once chamber 9 reaches popping temperature and the sound of popping is heard, the heat is raised as shown in FIG. 2. Continued heating causes the popping corn 13 to gradually fill the volume of chamber 9 until it reaches cover 5.

Figure 3:
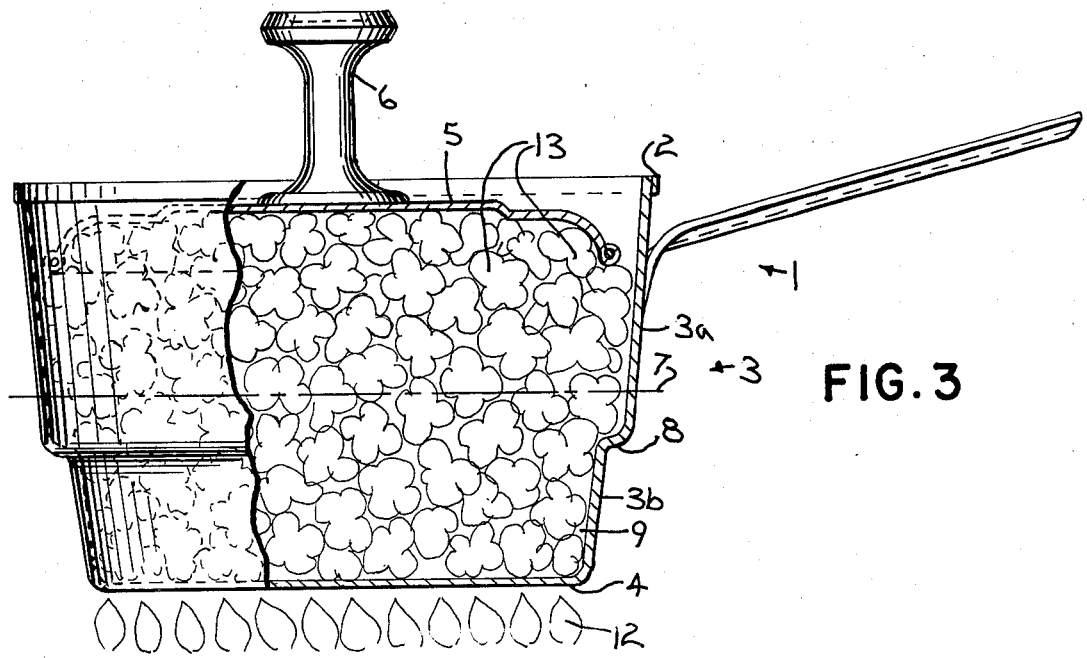
FIG. 3 shows the apparatus with the chamber expanded upwardly and substantially all of the kernels popped.

Turning now to FIG. 3, as the heating continues, and the popped corn 13 expands further, it causes cover 5 to rise upwardly and slidingly axially of the pan along upper wall portion 3a so that chamber 9 continuously expands in volume to approximately that of the total pan volume, while remaining essentially enclosed. During this period, and even though cover 5 is progressively rising, wall portion 3a forms a splatter shield to prevent turbulent oil droplets from escaping the pan. When substantially all kernels 10 are popped, the popcorn will no longer rise upwardly and the operation is terminated. The approximate maximum normal upper extent of popcorn rising is shown in FIG. 3, with all of the popped corn 13 still confined to the expanded enclosed chamber 9 within pan 1.

Various modes of carrying out the invention are contemplated as being within the scope of the following claims particularly pointing out and distincting claiming the subject matter which is regarded as the invention.

I claim:

1. The method of popping popcorn, comprising:
   (a) providing a pan and freely removable cover with the pan having an upper rim, a side wall and bottom with the rim and upper side wall portion forming a cross sectional pan area slightly greater than that of the cover, and with the side wall having a cover-receiving stop below the midline between the pan rim and bottom,
   (b) introducing solid popcorn kernels and liquid cooking oil into said pan,
   (c) placing said cover on said stop to form, with the lower side wall portion therebelow and said bottom, an expandable substantially enclosed small popping chamber having an initial volume less than one-half the total pan volume,
   (d) applying a relatively low preheat to said pan to bring said small chamber up to popping temperature,
   (e) then applying a heat higher than said preheat to said pan to cause corn to pop and to thereby increase in volume and fill said small enclosed chamber up to said cover,
   (f) then continuously enlarging and expanding said enclosed chamber upwardly to approximately the said total pan volume while shielding the area surrounding said pan against splatter by continuing to heat said pan so that the expanding solid popped corn causes said cover to progressively slide axially of said pan and along said upper wall portion, which functions as a splatter shield means,
   (g) and finally terminating the application of heat when said cover slidingly approaches said upper rim so that all of the popped corn is confined to the said enlarged and expanded enclosed chamber within said pan.

* * * * *